(12) United States Patent
Hogue et al.

(10) Patent No.: US 7,774,328 B2
(45) Date of Patent: Aug. 10, 2010

(54) BROWSEABLE FACT REPOSITORY

(75) Inventors: Andrew W. Hogue, Ho Ho Kus, NJ (US); Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 301 days.

(21) Appl. No.: 11/356,851

(22) Filed: Feb. 17, 2006

(65) Prior Publication Data
US 2007/0198503 A1 Aug. 23, 2007

(51) Int. Cl.
G06F 7/00 (2006.01)
G06F 17/30 (2006.01)
(52) U.S. Cl. .................................. 707/705
(58) Field of Classification Search ............... None
See application file for complete search history.

(56) References Cited

U.S. PATENT DOCUMENTS

| 5,475,819 | A | | 12/1995 | Miller et al. | |
|---|---|---|---|---|---|
| 5,560,005 | A | | 9/1996 | Hoover et al. | |
| 5,574,898 | A | | 11/1996 | Leblang et al. | |
| 6,101,515 | A | * | 8/2000 | Wical et al. | 715/234 |
| 6,718,324 | B2 | * | 4/2004 | Edlund et al. | 707/5 |
| 6,961,723 | B2 | * | 11/2005 | Faybishenko et al. | 707/3 |
| 7,043,521 | B2 | * | 5/2006 | Eitel | 709/202 |
| 2003/0120654 | A1 | * | 6/2003 | Edlund et al. | 707/7 |
| 2003/0154071 | A1 | | 8/2003 | Shreve | |
| 2004/0107125 | A1 | | 6/2004 | Guheen et al. | |
| 2006/0206508 | A1 | * | 9/2006 | Colace et al. | 707/100 |
| 2007/0055656 | A1 | * | 3/2007 | Tunstall-Pedoe | 707/3 |

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.

(Continued)

Primary Examiner—Pierre M Vital
Assistant Examiner—Loan T Nguyen
(74) Attorney, Agent, or Firm—Morgan, Lewis & Bockius LLP

(57) ABSTRACT

A fact repository supports searches of facts relevant to search queries comprising keywords and phrases. A service engine retrieves the objects that are associated with facts relevant to the query. The objects are displayed on a search results page. Each object is displayed with selection of the facts associated with the object. The selected facts are ordered according to their relevance to the query.

14 Claims, 15 Drawing Sheets

Example Format of Facts in Repository (each fact is associated with an object ID)

Example Facts in Repository (each fact is associated with an object ID)

OTHER PUBLICATIONS

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L, et al., "Answer Formulation for Question-Answering," 11 pages.

Liu, B. et al., "Mining Data Records in Web Pages," Conference '00, ACM, 2000, pp. 1-10.

Mccallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

PCT International Search Report and Written Opinion, PCT/US06/07639, Sep. 13, 2006, 6 pages.

Prager, J. et al., "IBM's PIQUANT in TREC2003," 10 pages.

Prager, J. et al., "Question Answering using Constraint Satisfaction: QA-by-Dossier-with-Constraints," 8 pages.

Ramakrishnan, G. et al., "Is Question Answering an Acquired Skill?", WWW2004, ACM, May 17, 2004, pp. 111-120.

* cited by examiner

Example Format of Facts in Repository (each fact is associated with an object ID)

| Object ID=1 | Fact ID=10 | Attribute= Name | Value = China | } 206
|---|---|---|---|
| 209 | 210 | 212 | 214 |

| Object ID=1 | Fact ID=20 | Attribute= Category | Value= Country | } 204
|---|---|---|---|

| Object ID=2 | Fact ID=30 | Attribute= Property | Value=A sample property fact for Bill Clinton: "Bill Clinton was the 42nd President of the United States from 1993 to 2001." | } 208
|---|---|---|---|

115

*FIG. 2(b)*
*Example Facts in Repository*
*(each fact is associated with an object ID)*

| Object ID=1 | Fact ID=10 |
|---|---|
| Object ID=1 | Fact ID=20 |
| Object ID=1 | Fact ID=30 |
| Object ID=2 | Fact ID=40 |

*FIG. 2(c)*
*Example Object Reference Table*

Example Format of Facts in Repository (each fact is associated with an object ID)

Example Objects

Google value:({12 May 1907}) [Search Objects]

Toggle highlighting  ~1103

1100

Results 1 - 6 of 6 for value:({12 May 1907})

Saved Results
[Clear]
[Remove All]

[Save Visible Results]

Leslie Charteris (person) [Limit search to type: 'person']
[Save]
- date of birth: 12 May 1907  http://en.wikipedia.org/wiki/Leslie_Charteris  More »
- Summary: Leslie Charteris (12 May 1907, Singapore 15 April 1993) was born Leslie Charles Bowyer-Yin, to a Chinese father and an English mother.  http://en.wikipedia.org/wiki/Leslie_Charteris
- date of death: 15 April 1993  http://en.wikipedia.org/wiki/Leslie_Charteris  More »
- full name: Leslie Charteris  http://en.wikipedia.org/wiki/Leslie_Charteris

Katharine Hepburn (person) [Limit search to type: 'person']
[Save]
- date of birth: 12 May 1907  http://en.wikipedia.org/wiki/Katharine_Hepburn  More »
- Summary:
  - ♦ Katharine Houghton Hepburn (12 May 1907- 29 June 2003) was an actress.  http://sample.wikipedia.org/wiki/Katharine_Hepburn
  - ♦ Katharine Houghton Hepburn (12 May 1907 29 June 2003) was an iconic star of American film, television and stage, widely recognized for her sharp wit, New England gentility and fierce independence.  http://en.wikipedia.org/wiki/Katharine_Hepburn
  - ♦ Silver screen legend, star of The African Queen.  http://www.who2.com/katharinehepburn.html
- cause of death: natural causes  http://en.wikipedia.org/wiki/Katharine_Hepburn  More »
- date of death: 29 June 2003

Joris-Karl Huysmans (person) [Limit search to type: 'person']
[Save]
- date of birth: 12 May 1907  http://en.wikipedia.org/wiki/Joris-Karl_Huysmans  More »
- Summary: Joris-Karl Huysmans (born Charles-Marie-Georges Huysmans, 5 February 1848 12 May 1907) was a French novelist.  http://en.wikipedia.org/wiki/Joris-Karl_Huysmans
- date of birth: 5 February 1848  http://en.wikipedia.org/wiki/Joris-Karl_Huysmans

FIG. 12

Google Reference Pages BETA

[attribute((date of birth)) value((12 May 1907))]  [Search Objects]

Toggle highlighting — 1203

[Save Visible Results]

Results 1 - 2 of 2 for [attribute((date of birth)) value((12 May 1907))]

1200

Saved Results
 [Table]
Jessica Simpson ☒
Britney Spears ☒
Remove All

Katharine Hepburn (person) [Limit search to type: 'person']
[Save!]
date of birth:      12 May 1907 ⎯ 1210    http://en.wikipedia.org/wiki/Katharine_Hepburn  More »
cause of death:     natural causes    http://www.who2.com/katharinehepburn.html
date of death:      29 June 2003    http://en.wikipedia.org/wiki/Katharine_Hepburn  More »
place of birth:     • Hartford, Connecticut    http://www.who2.com/katharinehepburn.html
                    • Hartford, Connecticut, USA    http://www.imdb.com/name/nm0000031/

⎫
⎬ 1202
⎭

Leslie Charteris (person) [Limit search to type: 'person']
[Save!]
date of birth:      12 May 1907    http://en.wikipedia.org/wiki/Leslie_Charteris  More »
Summary:            Leslie Charteris (12 May 1907, Singapore15 April 1993) was born Leslie Charles
                    Bowyer-Yin, to a Chinese father and an English
                    mother.  http://en.wikipedia.org/wiki/Leslie_Charteris
date of death:      15 April 1993    http://en.wikipedia.org/wiki/Leslie_Charteris  More »
full name:          Leslie Charteris    http://en.wikipedia.org/wiki/Leslie_Charteris

BROWSEABLE FACT REPOSITORY

CROSS REFERENCE TO RELATED APPLICATIONS

This application is related to the following U.S. Applications all of which are incorporated by reference herein:

U.S. application Ser. No. 11/357,748, entitled "Support for Object Search", filed on Feb. 17, 2006, by Alex Kehlenbeck, Andrew W. Hogue, Jonathan T. Betz;

U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,679, entitled "Query Language", filed, on Feb. 17, 2006, by Andrew W. Hogue, Doug Rhode;

U.S. application Ser. No. 11/356,837, entitled "Automatic Object Reference Identification and Linking in a Browseable Fact Repository", filed on Feb. 17, 2006, by Andrew W. Hogue;

U.S. application Ser. No. 11/356,842, entitled "ID Persistence Through Normalization", filed, on Feb. 17, 2006, by Jonathan T. Betz, Andrew W. Hogue;

U.S. application Ser. No. 11/356,728 entitled "Annotation Framework", filed Feb. 17, 2006, by Tom Richford, Jonathan T. Betz;

U.S. application Ser. No. 11/341,069 entitled "Object Categorization for Information Extraction", filed on Jan. 27, 2006, by Jonathan T. Betz;

U.S. application Ser. No. 11/356,838 entitled "Modular Architecture for Entity Normalization", filed on Feb. 17, 2006, by Jonathan T. Betz, Farhan Shamsi;

U.S. application Ser. No. 11/356,765 entitled "Attribute Entropy as a Signal in Object Normalization", filed on Feb. 17, 2006, by Jonathan T. Betz, Vivek Menezes;

U.S. application Ser. No. 11/341,907 entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277 entitled "Data Object Visualization Using Graphs", filed on Jan. 27, 2006, by Andrew W. Hogue, David Vespe, Alex Kehlenbeck, Mike Gordon, Jeffrey C. Reynar, David Alpert.

FIELD OF THE INVENTION

The present invention relates to a knowledge and fact databases, and in particularly to user interfaces, methods, and systems for browsing such database.

BACKGROUND OF THE INVENTION

Knowledge bases are collections of facts and data organized in into systematic arrangement of information. Online knowledge bases have become increasingly prevalent on the Internet, and examples include WordNet, Wikipedia, Webopedia, and similar online encyclopedias, dictionaries, and document collections. These knowledge bases are typically organized around individual documents ("articles") that describe topics of interest, such as persons, places, events, fields of knowledge, and the like. Each article on a particular subject or topic is the primary unit of storage and manipulation. That is, articles as a whole are used to describe a topic, and articles themselves are stored as single document typically containing a large block of unstructured (other than for formatting) text.

More particularly, in a typical online knowledge base such as Wikipedia or Wordnet, search tools are provided to search the knowledge for information. An underlying service engine or database management system receives a search query containing one or more keywords or phrases. The service engine then selects one or more articles that contains such keywords. Typically, the single article that best matches the keyword query, for example, the article having the query keywords in its title, will be retrieved and displayed to the user.

Returning an entire article however does not provide the user with information that quickly indicates which facts or details about the topic were most relevant to the user's query. When the entire article is returns to the user in the search results, the burden is upon the user to analyze the article to determine which portions are relevant to the query. At best, where the search query terms appearing in the title of the article, the user only knows that there is some article that discusses the topic named by the user's query. But this provides no information about which specific facts or details in this article are most important or relevant to an understanding of the topic. The user is left to reading or skimming the entire article to determine which facts may be most interesting or relevant to their purposes. Where the article is provided on the basis of a keyword match outside of the article's title, then perhaps a snippet of text in the body of the article is shown that contains the query keywords. However, the snippet does not necessarily reflect the details or facts about the topic that are most relevant to the user's query. Both of these problems result in part from the storage and retrieval of articles as unstructured content that cannot be dynamically configured based on a user's query.

SUMMARY OF THE INVENTION

The present invention provides a methodology and system for automatically creating and maintaining facts and links between facts and objects in a fact repository. The fact repository includes a large collection of facts, each of which is associated with an object, such as a person, place, book, movie, country, or any other entity of interest. Each fact comprises an attribute, which is descriptive of the type of fact (e.g., "name," or "population"), and a value for that attribute (e.g., "George Washington", or "1,397,264,580"). A value can also contain any amount of text—from a single term or phrase to many paragraphs or pages—such as appropriate to describe the attribute. Each object will have a name fact that is the name of the object. The value of an attribute can thus include one or more phrases that are themselves the names of other objects. Facts are preferably stored individually and separately, allowing them to be individually selected and configured in response to user queries.

In one embodiment, there is provided a computer implemented method for enabling browsing in the fact repository. A search query is received, which may contain keywords or phrases. The search query is used to search the fact repository for objects that are relevant to the search query. Each object is displayed with a plurality of facts that are associated with the object. The facts are displayed in a rank order based on a function of their relevance to the query. Associated with each displayed object is an object name link, which comprises a name fact for the object, and a link to an page containing additional facts associated with the object.

The present invention further has embodiments in computer program products, in computer systems, and computer user interfaces, which various perform or cooperate in the operation or use of the foregoing method (or its alternative embodiments and features).

BRIEF DESCRIPTION OF THE DRAWINGS

FIGS. 2(a)-2(d) are block diagrams illustrating a data structure for facts within a repository of FIG. 1 in accordance with preferred embodiments of the invention.

FIG. 5 illustrates the results of a search query link.

FIG. 6 illustrates another search results page.

FIG. 7 illustrates an object detail page.

FIG. 10 illustrates a search result page from an attribute search link in FIG. 9.

FIG. 11 illustrates a search results page from a value search link in FIG. 9.

FIG. 12 illustrates a search results page from an attribute-value search link in FIG. 9.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

System Overview

Figure 1:
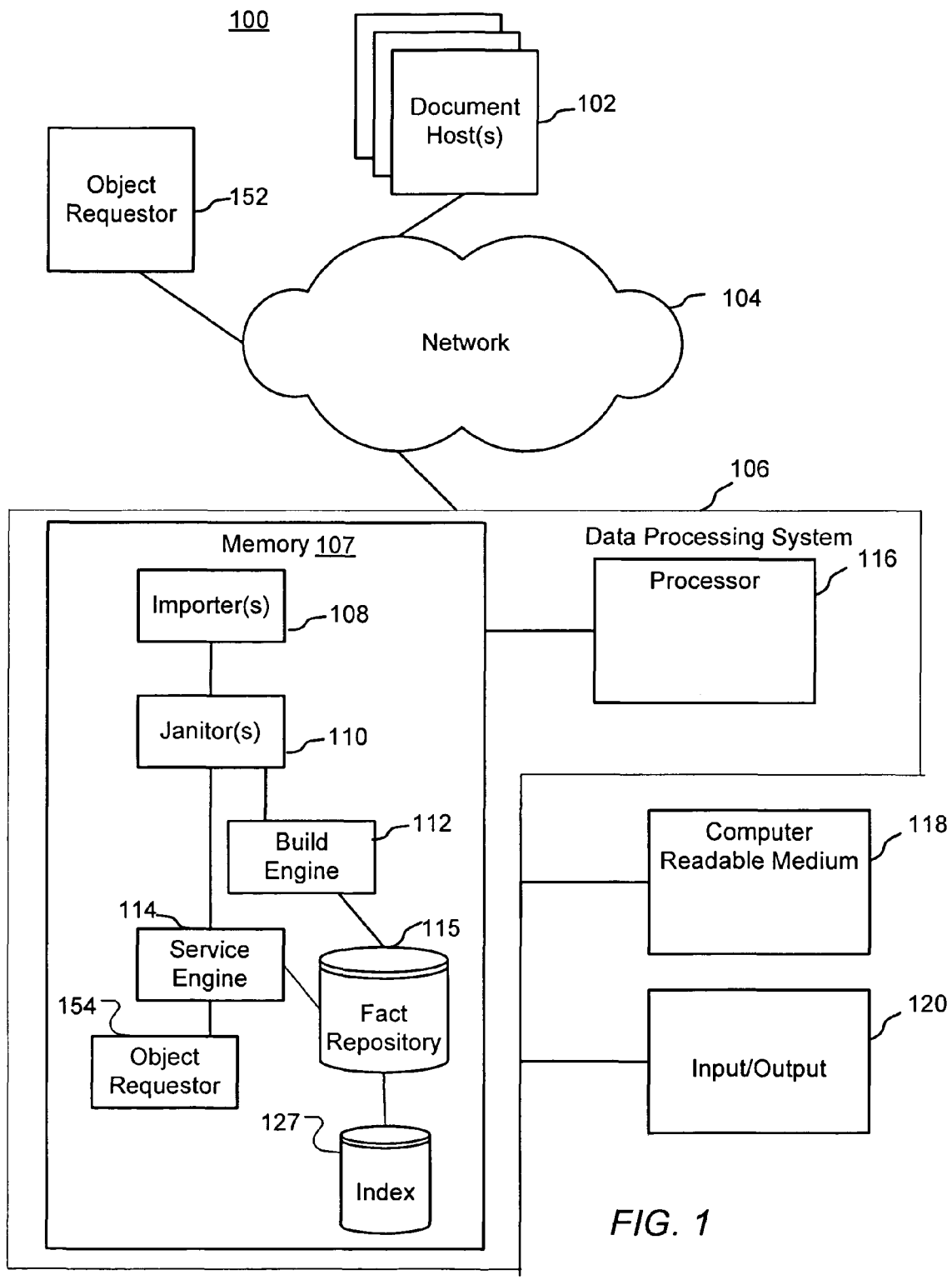
FIG. 1 shows a system architecture, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as Birthdate by one janitor and then another janitor might notice that Dec. 2, 1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Figure 2A:
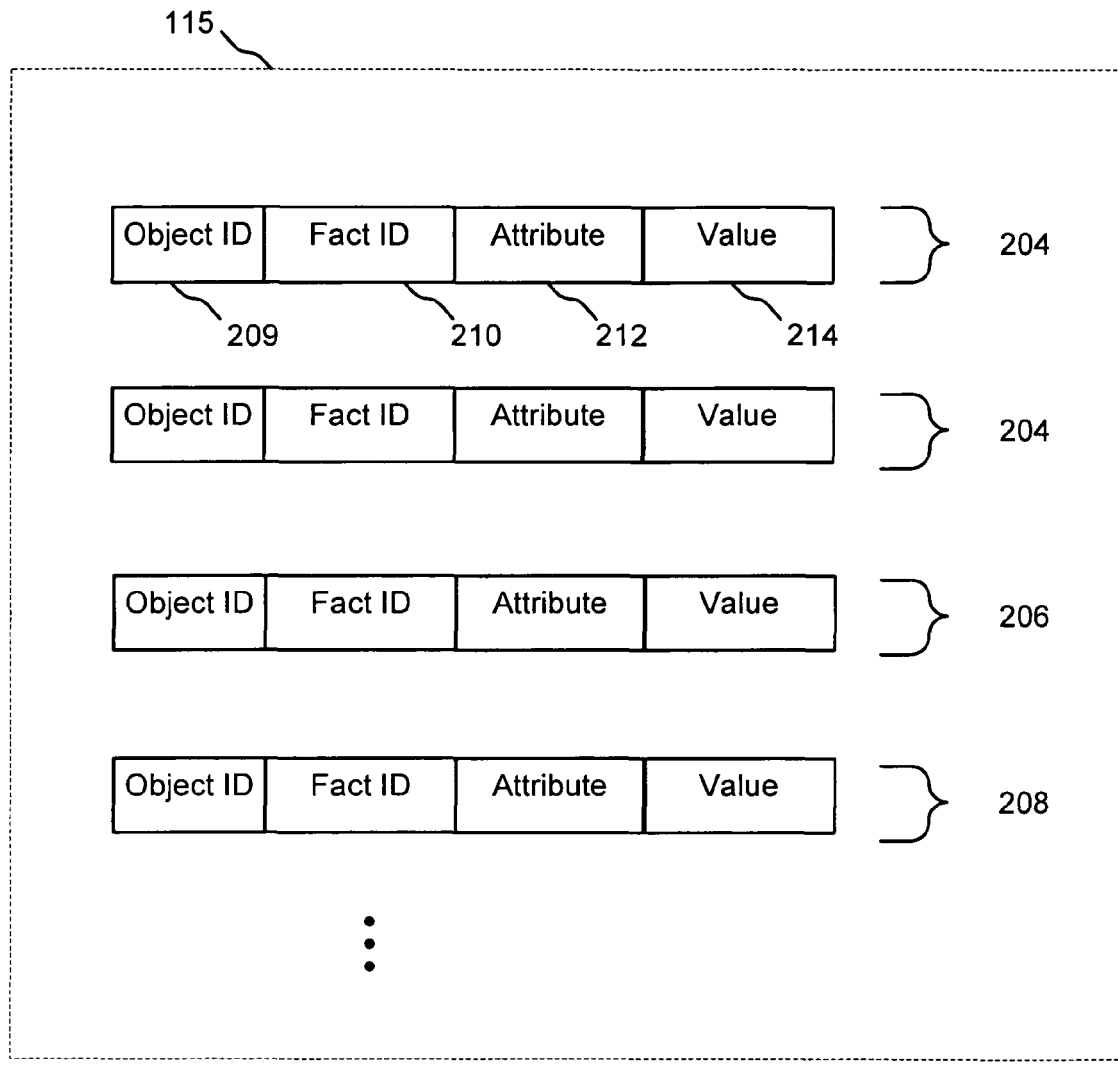

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(*a*)-2(*d*).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

FIG. 2(*a*) shows an example format of a data structure for facts within repository 115, according to some embodiments of the invention. As described above, the repository 115 includes facts 204. Preferably, each fact is stored separately and independently. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

Figure 2D:
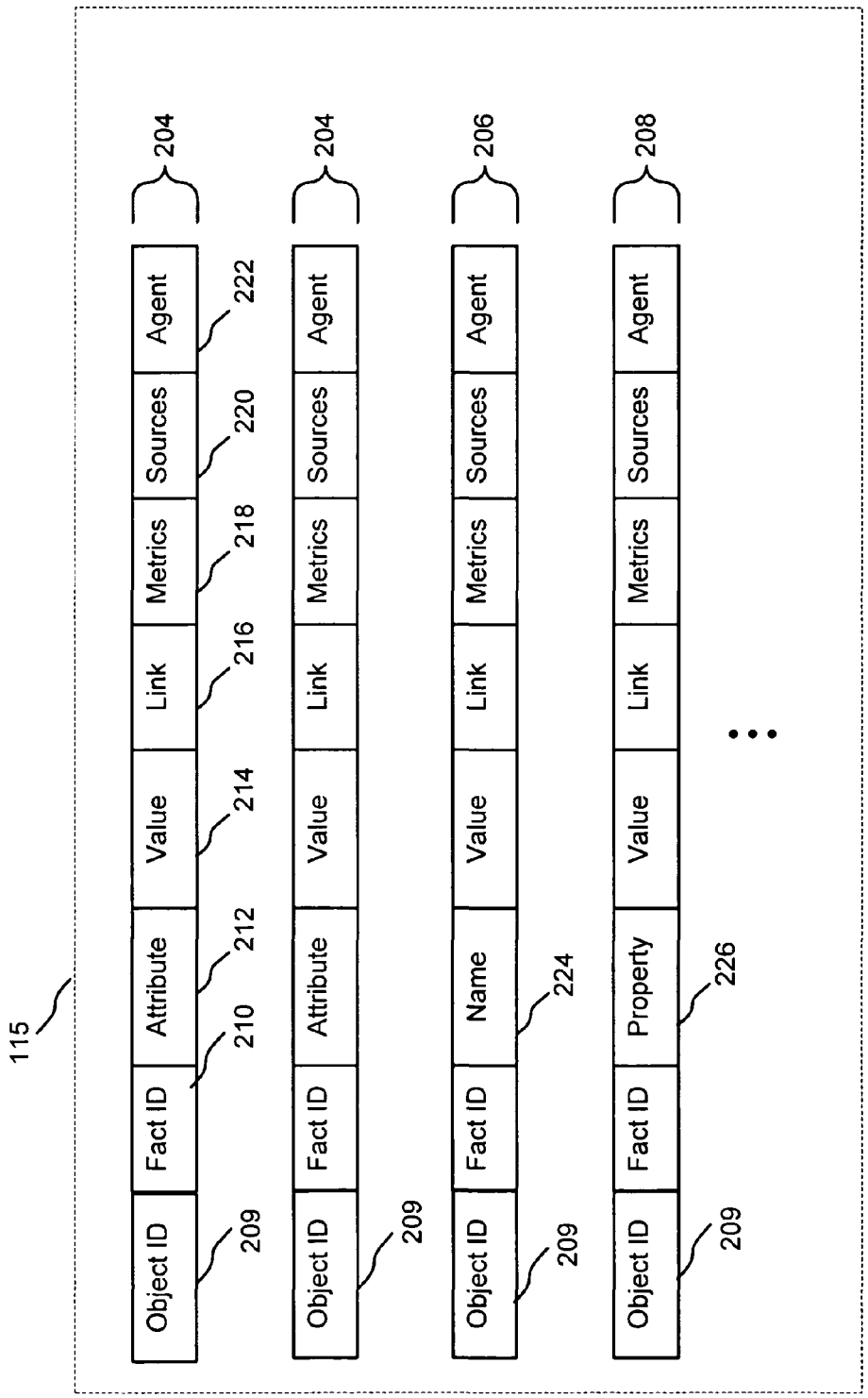

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
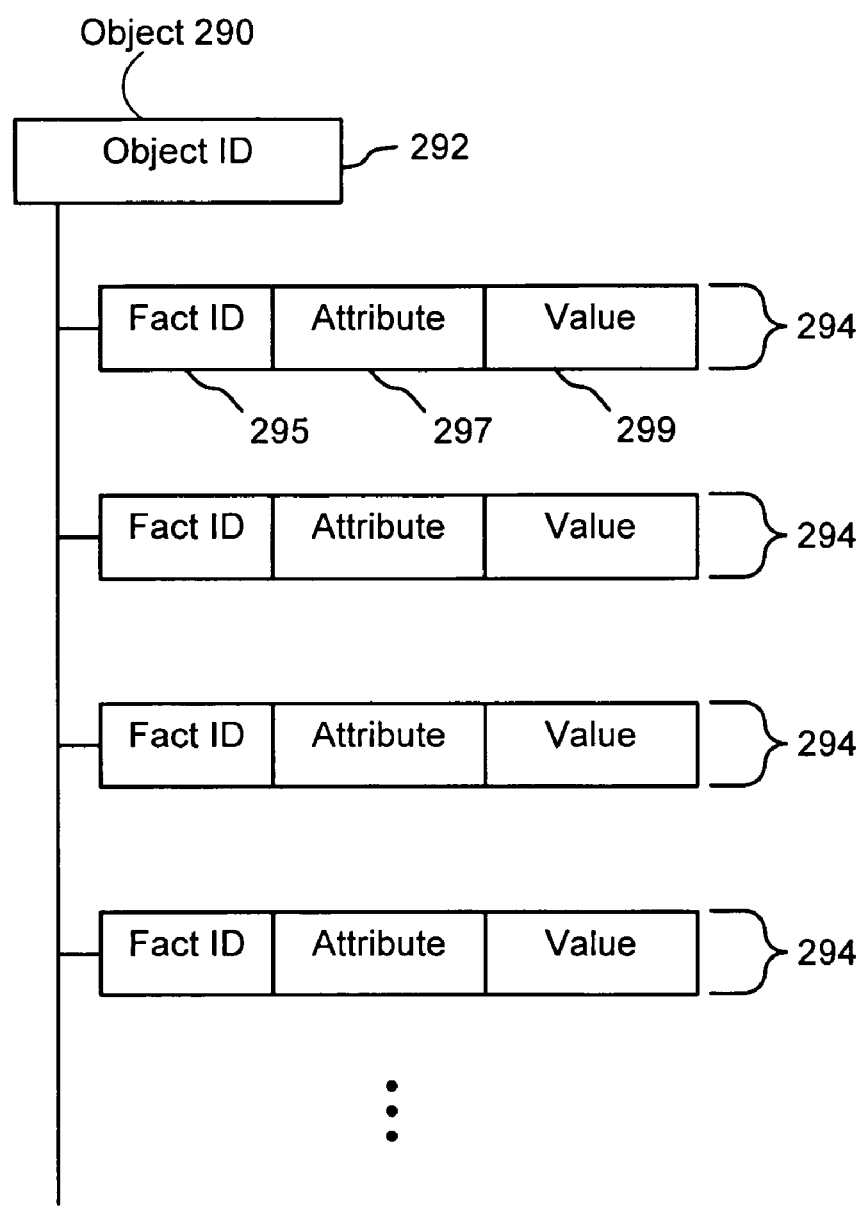
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Referring again to FIG. 1, the content of the facts in the repository 115 are also indexed in index 127. The index 127 maintains a term index, which maps terms to {object, fact, field, token} tuples, where "field" is, e.g., attribute or value. The service engine 114 is adapted to receive keyword queries from clients such as object requestors, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results.

In one embodiment the ranking (score) of an object is a linear combination of relevance scores for each of the facts. The relevance score for each fact is based on whether the fact includes one or more query terms (a hit) in either the attribute or value portion of the fact. Each hit is scored based on the frequency of the term that is hit, with more common terms getting lower scores, and rarer terms getting higher scores (e.g., using a TF-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts is selected for display in response to query.

The service engine 114 is also adapted to handle structured queries, using query operators that restrict the scope of a term match. A fact restriction operator, comprising brackets enclosing terms, e.g., "[terms] ", restricts the term(s) to matching in a single fact. Field restriction operators attribute{ } and value{ } operators restrict to a single field. Thus, the query [attribute{name} value{"george washington"}] restricts the scope of the match to the terms "george washington" appearing in the name fact.

User Interface for Browsing Fact Repository

Figure 3:
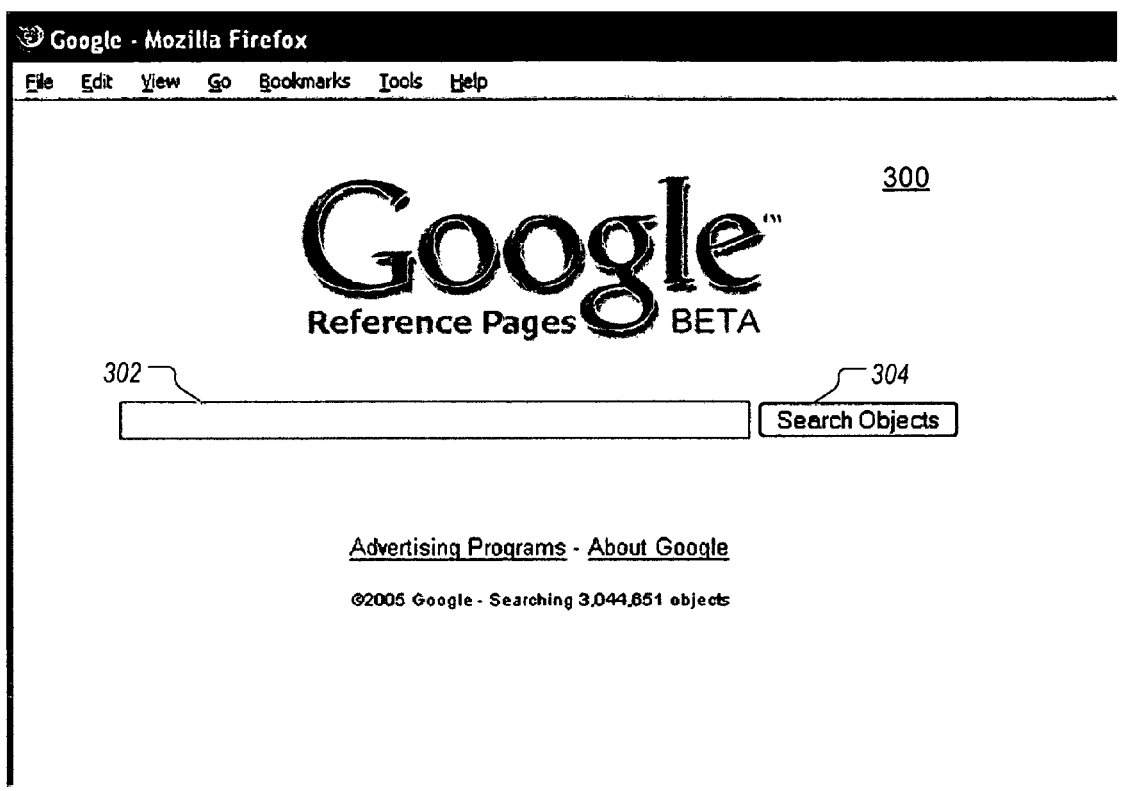
FIG. 3 illustrates a landing page for initiating a search query of a fact repository.

Referring now to FIGS. 3-12, there is shown various example screens from a user interface for browsing the fact repository in accordance with one embodiment of present invention. In FIG. 3 there is shown a simple landing or home page for initiating a query of the fact repository 115. The page 300 a search query field 302 and a search objects button 304. The user enters any number of search terms into the search field 302. The terms can be any terms whatsoever, as they may appear in any fact. The user selects the search objects button 304 to provide the search terms to the service engine 114.

Figure 4:
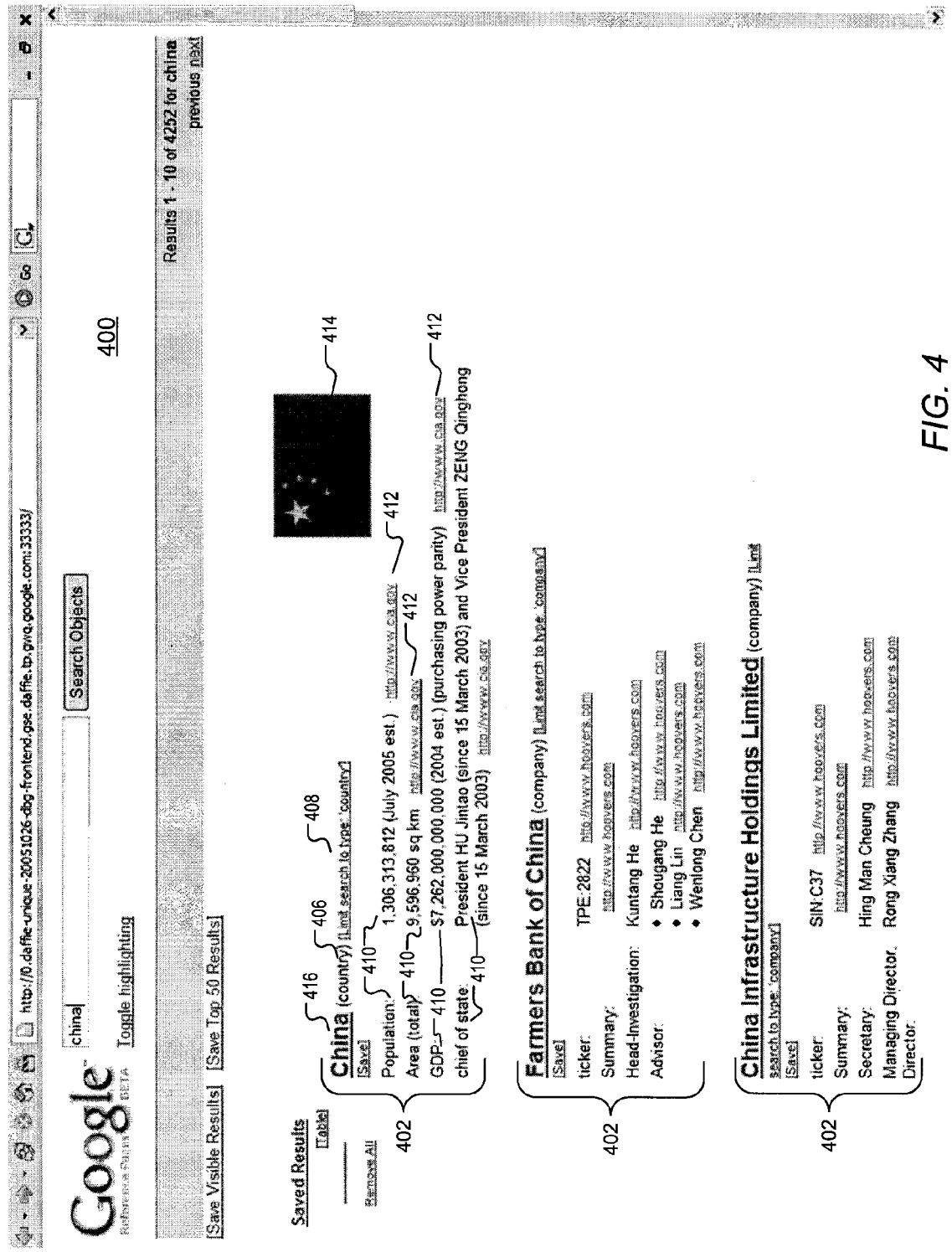
FIG. 4 illustrate a search results page.

FIG. 4 illustrates the search result page 400 of a search, here for the search query "china." The results page 400 includes a list of ranked search results 402, each search result 402 comprising a name link 416 to an object, the anchor text of the link 416 being the name of the object (the name link 416 resolves to an object detail page, as further described below). The results 402 are ranked according to their relevance to the search query. Each search result 402 (which for the purpose of this discussion can also be referred to as an object) is optionally displayed with a label 406 indicating the category of the object (e.g., country, company, person, car, etc.).

Next to each search result 402 is displayed one example of an object search link 408. When selected, the object search link 408 causes a search query to be sent from the client device to the service engine. This search query is for objects of the same category as the search result object, and which contain the current search query terms in at least one of the facts associated with such object. For example, in response to the user clicking on the search link 408, a search query is sent to the service engine 127 for objects of category "country" and which contain the search term "china" in one or more facts. Thus, the object search link operates to further filter out the search results, such as the second and third search results 402 which are companies, and not countries. Additional examples of object search links are discussed below.

Figure 5:
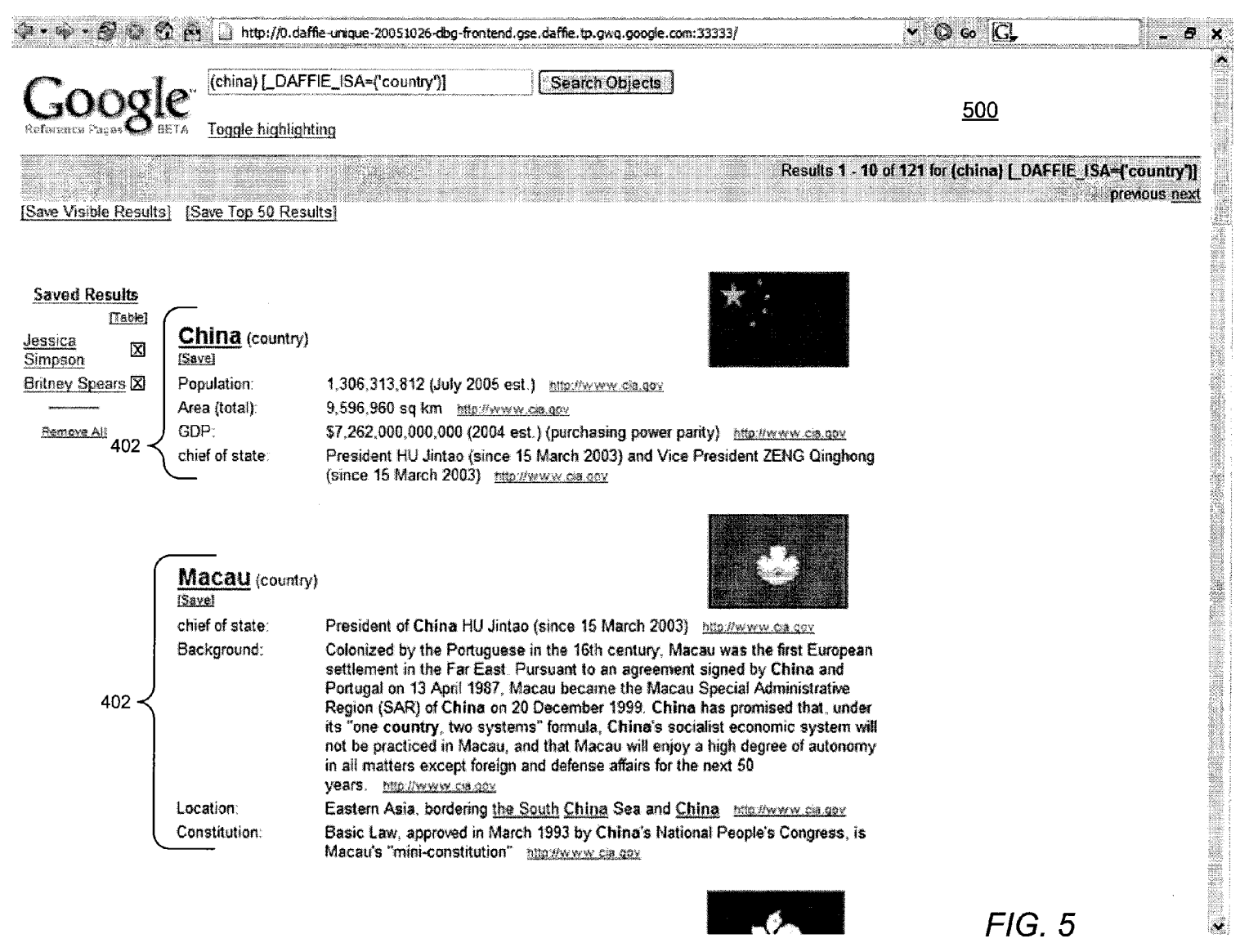

FIG. 5 illustrates an example of such a search link 408. This figure illustrates the resulting page after search link 408 was selected by the user. The search link resulted in search query being transmitted to the service engine (as shown in the search query field 302), which then provides search results 402 of other objects having a "category" fact of "country", and which contain the search term "china" in one or more facts.

Referring again to FIG. 4, displayed in conjunction with each search result 402 is a list of one or more facts 410 associated with the object. The list of facts 410 is ordered according to relevance of the fact for the query and to the object. Thus, in the first search result 402 for the "China" object, four facts 410 are listed, these being the population fact, the area fact, the GDP fact, and the chief of state fact. By comparison, in the second search result 402 for the "Farmers Bank of China" fact, the four facts are entirely different, but again ordered by relevance to query and to object itself. Each fact 410 is preferably displayed with both its attribute such as "population," and its value, such as "1,306,313,812."

Figure 6:
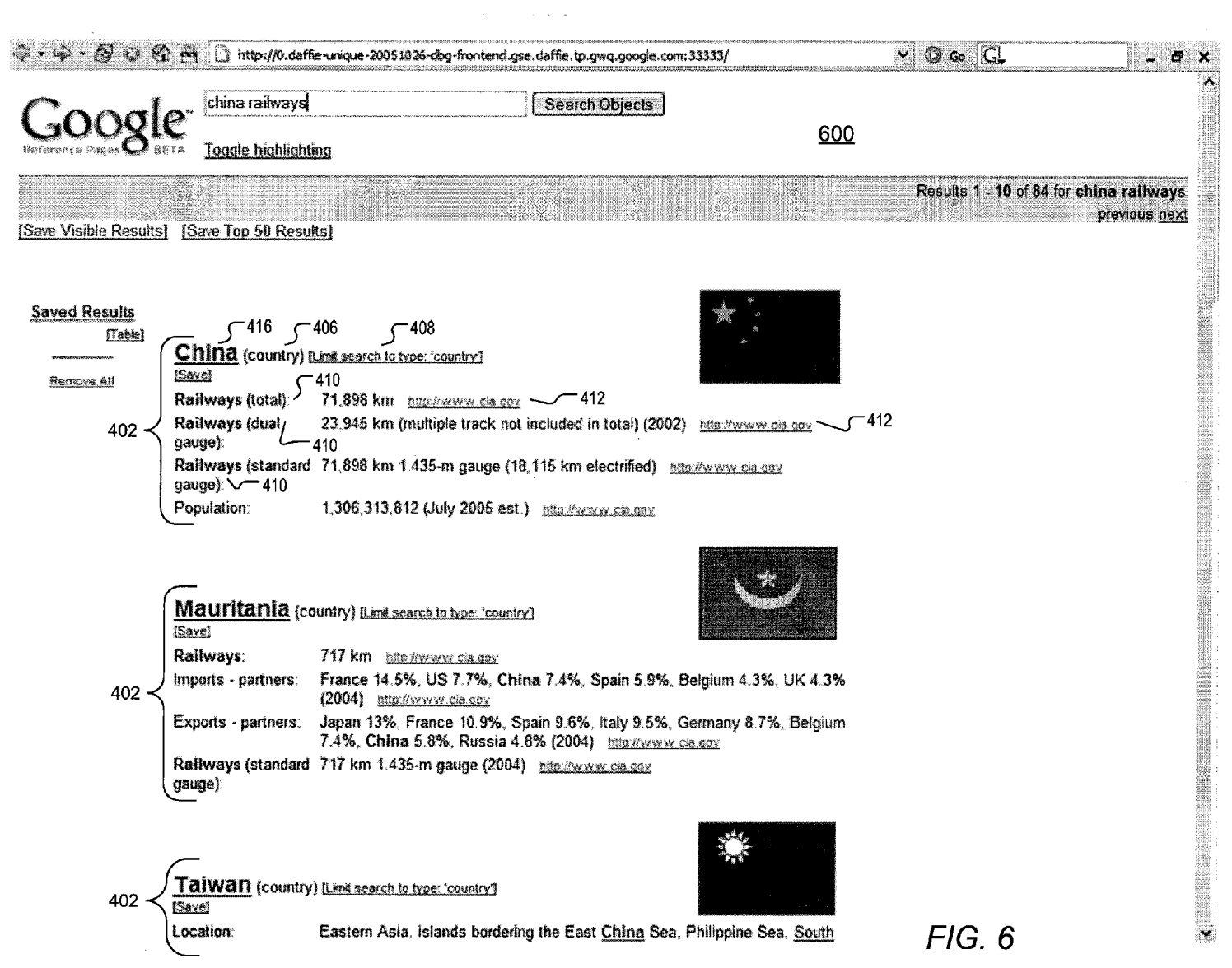

FIG. 6 further illustrates the selection of facts 410 for display with the object of a search result 402 based on the relevance of the fact to the object. In FIG. 6, the search query of "china railways" yields a set of search results 402, again including a result for the "China" object. However, in this case, some of selected facts 410 are those relevant to railways in China as shown by facts 410 for the total length of the railways in China, total standard and dual gauge, and then again the population fact.

Referring again to FIG. 4, preferably, each fact 410 is displayed with source link 412 which links to the source of the factual information on which the fact is based. In the illustrated embodiment, the anchor text for the source link 412 is the URL for the source itself (or a portion thereof), but other anchor text may be used as well (e.g., a name of the source), particularly if the URL is not descriptive of the source. Selecting the source link 412 accesses the source, either for the page of the source that directly contains the fact, or other some other portion of the source, such as the home page. Alternatively, some portion of the fact value may be used as the anchor for the source link 412.

One more or links to media files 414 may also be displayed in conjunction with the search result 402. The media link 414 may be displayed if available for the object, for any type of object. The type of media link 414 may be dependent on the type of object in the search result. In the example of FIG. 4, there is shown an image of the flag for China. In addition, a link to a representative audio file (e.g., a national anthem, or a historic, or recent event) may be provided. For a person object, the media link 414 may be to an image of the person, or a video file of the person; similarly link 414 may be to an audio recording (e.g., a speech, statement or song) associated with the person.

The media link 414 may also be to a service or system from which one or more media files associated with the object may be purchased, such as a link to a download music or video service. This is advantageous to the user where the search result object is a person such as a musician, and the media link 414 is a search link to an online music service to search for one or more songs performed by the person, and then provide the purchase opportunity to the user. As another example, where the person is an actor, the media link 414 may be search link to an online video rental service (or download service) for one more movies in which the person performed.

As yet another example, the media link 414 may be a search link to an online retailer to purchase a book associated with the object. If the object is a person, then the media link 414 can be a search link to an online retailer (or other entity, e.g., classifieds, auction site, etc.) and resolve to one or more books written by the person (e.g., where the person object is author, such as Joseph Conrad), or about the person. Similarly, where the object is some other entity, e.g., a country, company, automobile, the media link 414 may be a search link to an online retailer and resolves to one or more books about the country, company, automobile, and so forth. Other examples of links 414 include links to stock tickers or prices where the object is company, links to blogs regarding the object, links to news reports relevant to the object, and so forth.

Figure 7:
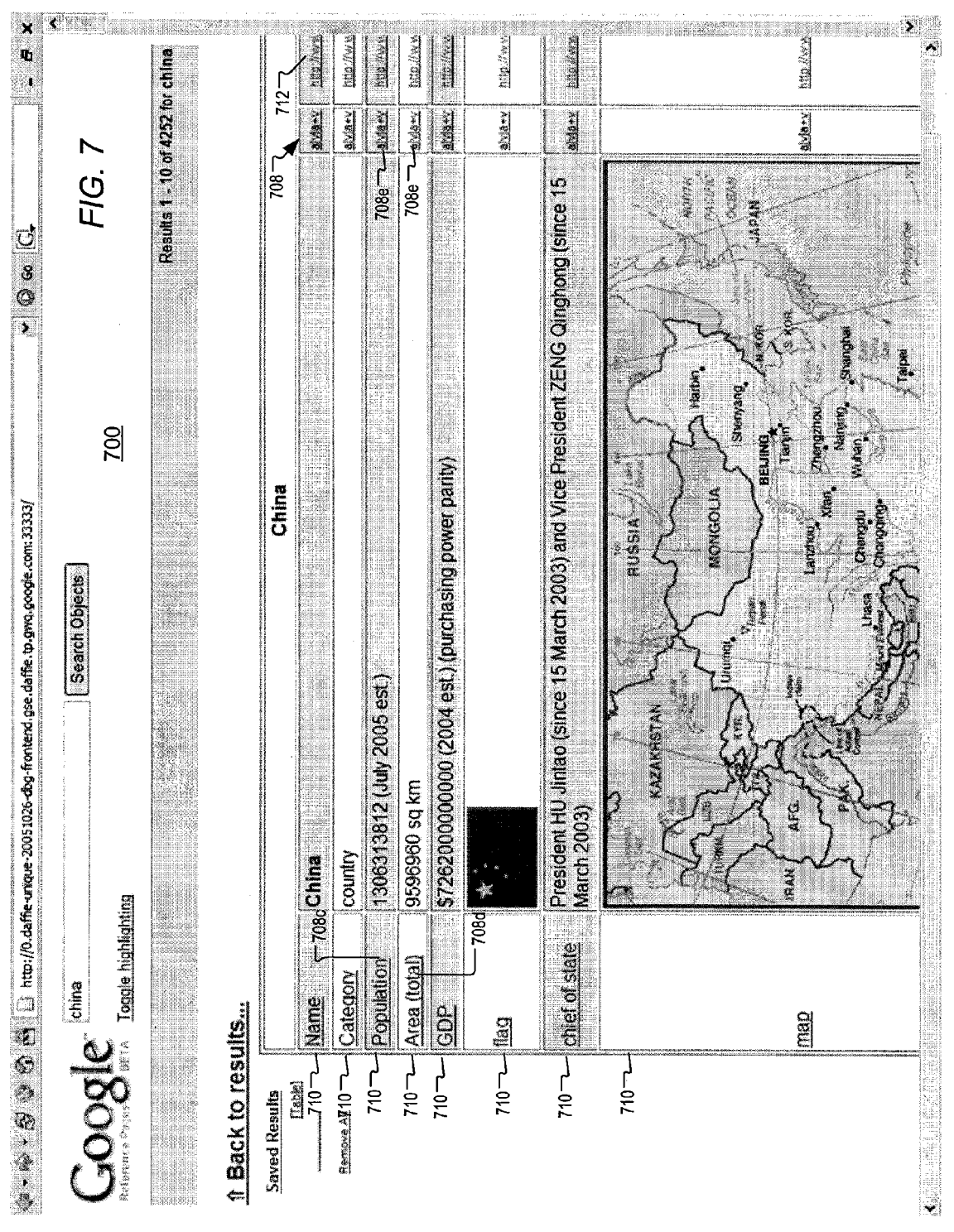

Selection of the name link 416 for an object search result 402 produces an object detail page 700 for the object, such as illustrated in FIG. 7. The object detail page 700 contains a list of the facts 710 associated with the object, each fact 710 including its attribute (e.g., "name," "category," "population," etc.) and its value. The facts 710 may be listed on a single detailed result page 700, or on several linked pages. The object detail page 700 can be presented as a table with fixed size columns, or a list. Facts 710 can be textual or graphical, as shown by the flag fact and the map fact. Each fact 710 is also associated with a source link 712 to a source of the fact.

In one embodiment, each fact 710 is further associated with one or more object search links 708. In the illustrated embodiment of FIG. 7, some of the object search links 708 are associated with search queries for objects having a fact of the same attribute as the current object. Thus, search link 708c is associated with a search query for objects that have a "population" fact, and search link 708d is associated with a search query for objects that have an "area" fact. These particular object search links are called attribute search links, because they search for objects that simply have facts for the same type of attribute, regardless of the value of the attribute. A search link 708, such as attribute search link 708c, can use any text as the anchor text. Thus, another implementation of this attribute search link is the search link 708e with the anchor text "a" in the third column of the table in FIG. 7.

Figure 8:
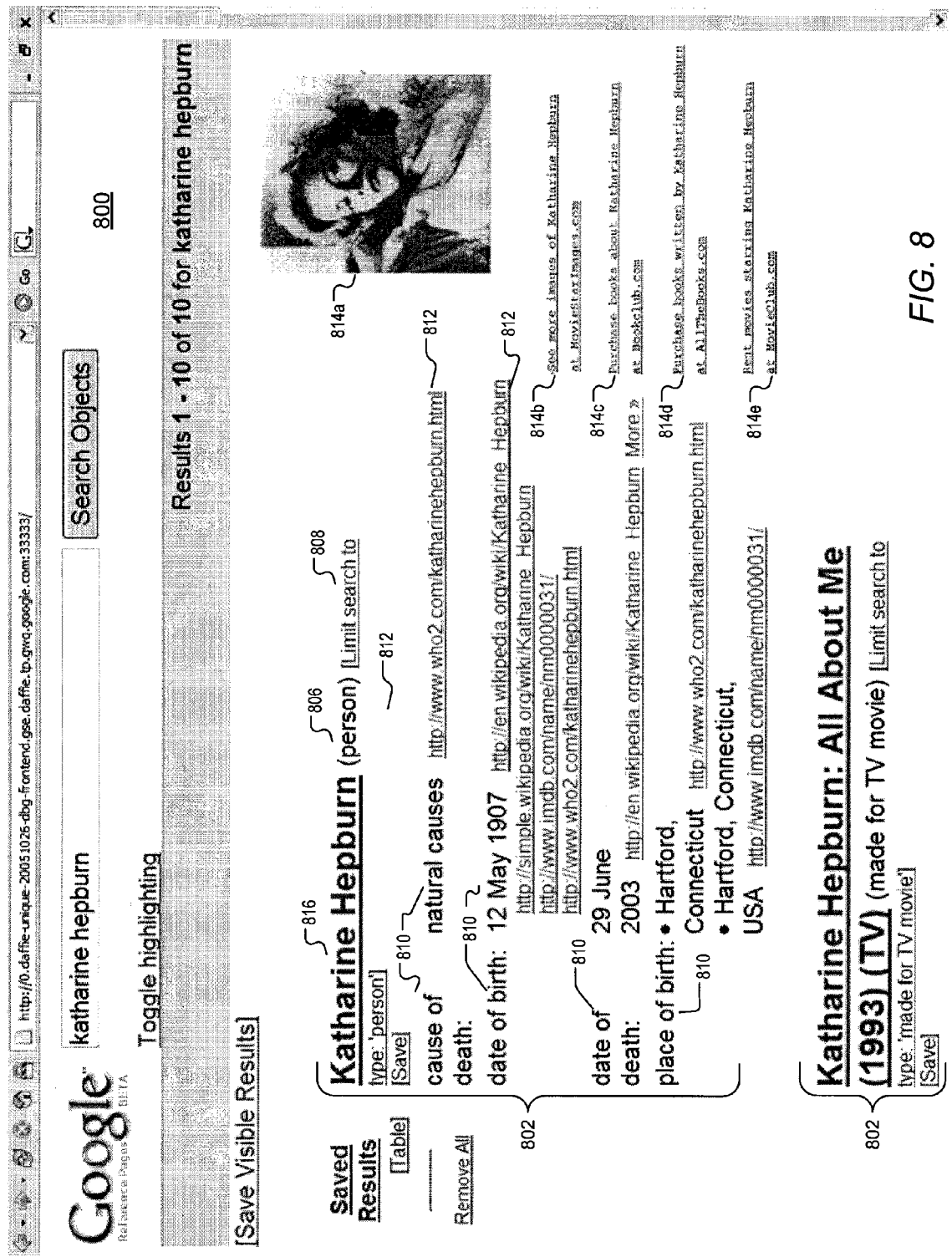
FIG. 8 illustrates another search results.

FIGS. 8-12 further illustrate the operation and benefits of the object search link. First, FIG. 8 illustrates a search results page 800 for a search query "katharine hepburn". The search results 802 include various objects, again ranked by relevance to the query, including the "Katharine Hepburn" object for the person herself, and a different object, the "Katharine Hepburn: All About Me (1993) (TV)" object for a made-for-television movie [about the Hollywood diva]. Again, each search result 802 includes a set of facts 810, ranked by relevance. In this example, the most relevant fact 810 has been determined by the service engine 114 to be the "cause of death" fact 810. As before, each fact 810 has a value (e.g., "natural causes"), and a source link 812. The name link 816 of the object leads to the object detail page for the "Katharine Hepburn" object. Next to the name link 816 is the label 806 for the category of this object (here, a "person"), and a search link 808 to a search query for other person objects that contain the query term "katharine hepburn". FIG. 8 also illustrates several different types of media links 814, including a media link 814a to an image of Katharine Hepburn, a media link 814b to a source of additional [smoldering] images of Katharine Hepburn, a media link 814c to an online retailer of books for books about Katharine Hepburn, a media link 814d to another online retailer of books for books authored by Katharine Hepburn, and finally, a media link 814e to an online movie rental site to movies starring Katharine Hepburn. Each of the foregoing media links 814 is preferably implemented as a search link which passes a search query of the appropriate type to the source (e.g., a query on "Katharine Hepburn" and additional field constraints as appropriate, such as "author" or "actor").

Figure 9:
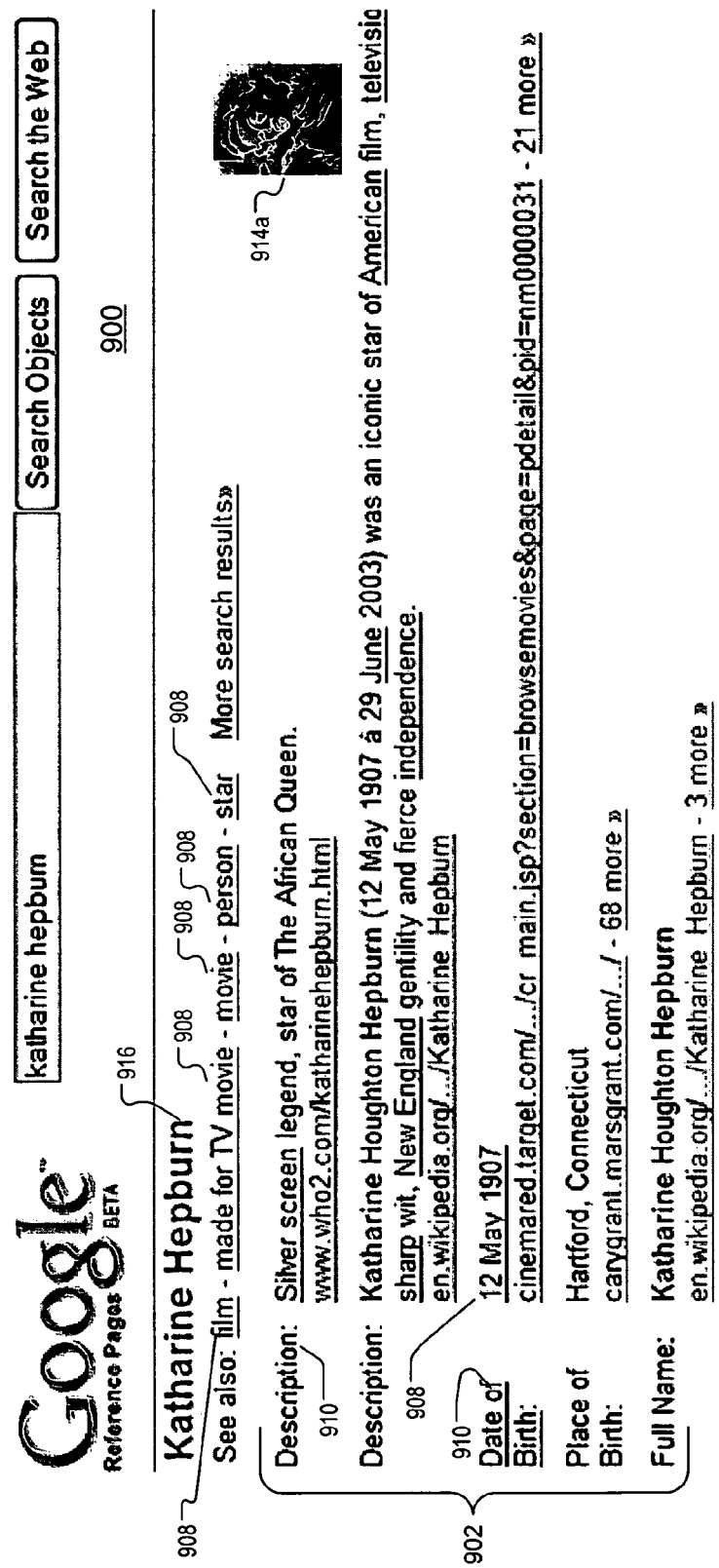
FIG. 9 illustrates another object detail page, from the search results page of FIG. 8.

FIG. 9 illustrates the object detail page 900 for the "Katharine Hepburn" object. Again, the facts associated with this object are displayed in a list, rather than as a table as in FIG. 7. Of interest in this example object detail page 900 is attribute "date of birth" in fact 910 and its associated value "12 May 1907." Both the attribute "date of birth" and the value "12 May 1907" serve as anchor text to object search links 908. Thus, the text "date of birth" of this attribute is the anchor text for search link for a search query for any object having a fact has "date of birth" attribute; or in more simplified terms, a search for any object that has a date of birth. Additional search links 908 are included to other attributes that are in common with this object. In one embodiment, the selection of which additional search links 908 are included is determined by the relevance of the attributes to the current object.

Figure 10:
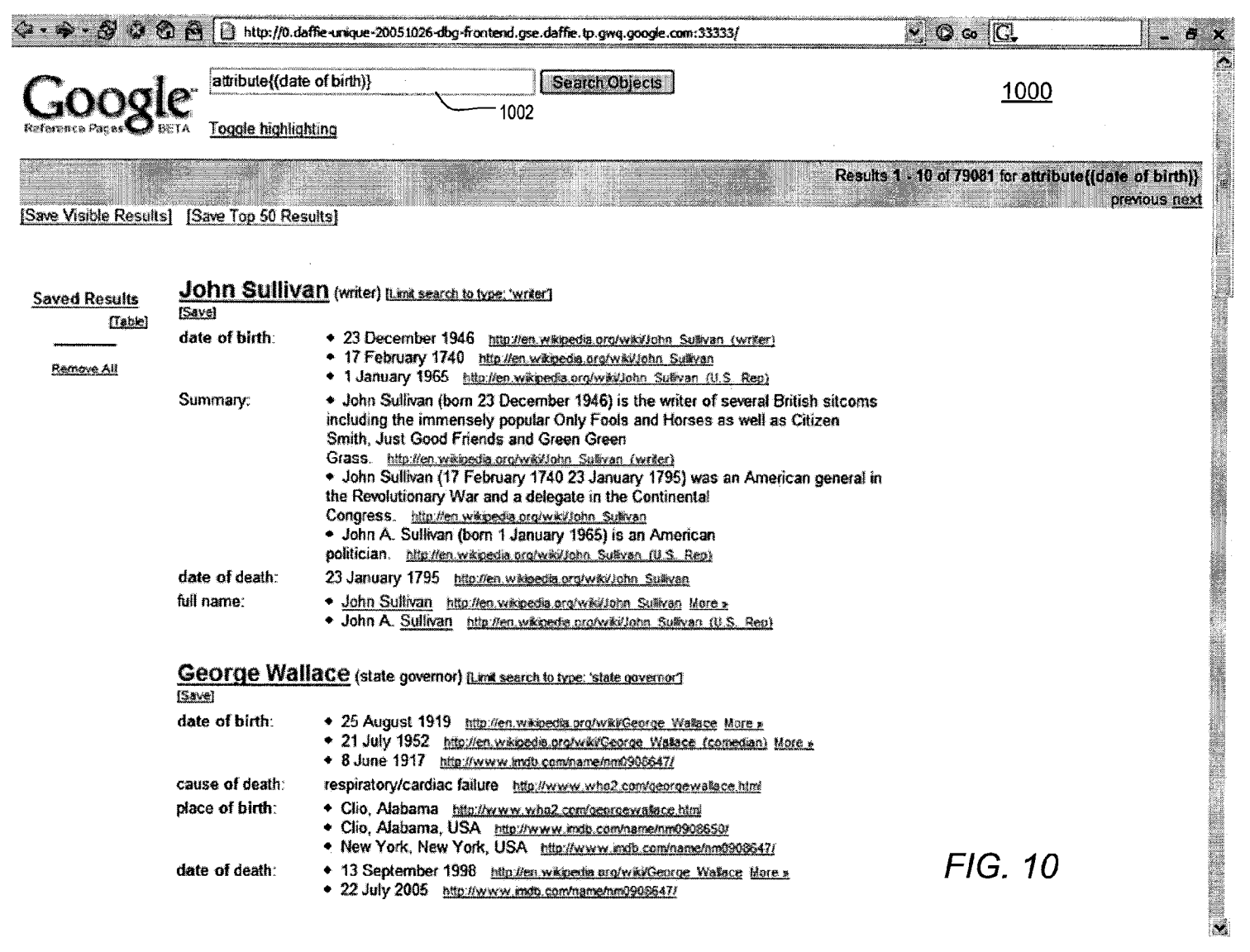

Selection of the search link 908 for the date of death results in the search results page 1000 illustrated in FIG. 10. As shown in the search query field 1002, the search query is "attribute{(date of birth)}", and is processed to select from the fact repository 115 the objects which have a fact for the attribute "date of birth." As expected, and illustrated in FIG. 10, this is primarily people.

Returning briefly to FIG. 9, the value "12 May 1907" for this factor is the anchor text for search link 908 for a search query for any object having any fact with a value of "12 May 1907", and regardless of whether that value is for the date of birth or others. FIG. 11 illustrates the search results page 1100 for this search. Again, the search query field 1103 shows the search query of "value{(12 May 1907)}" which returns several person objects, including the third one for "Joris-Karl Huysmans", which includes facts 1110 ("date of death", and "summary") that contain the string "12 May 1907".

Finally, an object or fact as displayed on search results page or an object detail page may include an object search link for a combined attribute-value pair. This is called an attribute-value search link. This type of search link is associated with a search query for objects having a fact in which the attribute and the value of the attribute match the input search. Referring briefly to FIG. 9, there is shown a search link 908c for objects containing this type of search. FIG. 12 illustrates the search results page 1200 from selection of search link 908c. As shown in search query field 1203, the search query includes restrictions for both the attribute and its value, expressed as "[attribute{(date of birth)} value{(12 May 1907)}]". The search results 1202 include both the "Katharine Hepburn" object, and the result for a "Leslie Charteris" object, which also has a fact matching the attribute of "date of birth" and matching the value "12 May 1907".

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method of enabling browsing of a fact repository comprising a plurality of facts, associated with objects, the method comprising:
   at a computer system including one or more processors and memory storing one or more programs, the one or more processors executing the one or more programs to perform the operations of:
   receiving a search query;
   retrieving in response to the search query a plurality of retrieved objects from the fact repository relevant to the search query, a respective retrieved object including a multiplicity of facts of the fact repository, wherein the fact repository includes facts that have been extracted from documents, and wherein the facts are associated with the plurality of retrieved objects from the fact repository;
   displaying the plurality of retrieved objects rank-ordered by relevance to the search query; and
   displaying for the respective retrieved object:
      a plurality of facts, of the multiplicity of facts, the displayed facts rank-ordered by relevance to the search query;
      a link to at least one object detail page for the respective retrieved object, the object detail page containing a plurality of additional facts included with the respective retrieved object of the fact repository; and
      a search link associated with a search query to execute by a service engine when selected by a user, wherein the search query includes at least one search query term derived from the plurality of facts associated with the at least one retrieved object.

2. The method of claim 1, wherein each fact is stored as a separate item of data in the fact repository.

3. The method of claim 1, further comprising:
   displaying for each retrieved object, a name fact of the retrieved object.

4. The method of claim 1, further comprising:
   displaying for each retrieved object a label indicating a category of the retrieved object, the label derived from a fact associated with the retrieved object.

5. The method of claim 1, further comprising:
   displaying for each retrieved object an attribute search link, the attribute search link associated with a search query comprising an attribute of the retrieved object, and adapted to be executed by the service engine in response to a user selection of the search link;
   responsive to receiving a selection of the search link, providing the search query to the service engine for retrieving objects having facts matching the attribute of the search link;
   receiving from the service engine at least one search result including an object having at least one fact matching the attribute of the search link; and
   displaying the object and the at least one fact.

6. The method of claim 1, further comprising:
   displaying for each retrieved object a value search link, the value search link associated with a search query comprising a value of the retrieved object, and adapted to be executed by the service engine in response to a user selection of the search link;

responsive to receiving a selection of the search link, providing the search query to the service engine for retrieving objects having facts matching the value of the search link;

receiving from the service engine at least one search result including an object having at least one fact matching the value of the search link; and displaying the object and the at least one fact.

7. The method of claim 1, further comprising:

displaying for each retrieved object an attribute-value search link, the attribute-value search link associated with a search query comprising an attribute of the retrieved object and a value of the attribute, and adapted to be executed by the service engine in response to a user selection of the search link;

responsive to receiving a selection of the search link, providing the search query to the service engine for retrieving objects having facts matching the attribute of the search link and having a value matching the value of the search link;

receiving from the service engine at least one search result including an object having at least one fact matching the attribute of the search link and the value of the attribute; and displaying the object and the at least one fact.

8. The method of claim 1, further comprising:

for at least one fact of at least one retrieved object, displaying a source link to a source of the fact.

9. The method of claim 8, wherein the source link includes anchor text, and the anchor text is Uniform Resource Locator or a portion thereof of the source of the fact.

10. The method of claim 8, wherein the source link includes anchor text, and the anchor text is a name of source of the fact.

11. The method of claim 1, further comprising:

for at least one retrieved object, displaying a media link to a media file associated with the retrieved object.

12. The method of claim 1, further comprising:

for at least one retrieved object, displaying a media link to a system from which a media file associated with the retrieved object can be purchased.

13. A computer-implemented method, comprising:

at a client computer system including one or more processors and memory storing one or more programs, the one or more processors executing the one or more programs to perform the operations of:

in response to receiving a search query for a fact repository from a user of the client computer system, transmitting the search query to the fact repository, wherein the fact repository includes objects and associated facts, and wherein the facts have been extracted from documents;

receiving a search results page including object links for objects in the fact repository, and facts included with the objects from the fact repository, and search links, wherein the object links are ranked in accordance to the search query, and wherein for a respective object link for an object, a multiplicity of facts included with the object are ranked in accordance to the search query, and wherein a respective search link is associated with a search query to execute by a service engine when selected by a user, wherein the search query includes at least one search query term derived from the plurality of facts associated with the at least one retrieved object; and displaying the search results page on a user interface of the client computer system.

14. A computer implemented method of enabling browsing of a fact repository comprising a plurality of facts, associated with objects, the method comprising:

at a server including one or more processors and memory storing one or more programs, the one or more processors executing the one or more programs to perform the operations of:

receiving a search query from a requestor;

retrieving in response to the search query a plurality of retrieved objects from the fact repository relevant to the search query, a respective retrieved object including a multiplicity of facts of the fact repository, wherein the fact repository includes facts that have been extracted from documents, and wherein the facts are associated with the a plurality of retrieved objects from the fact repository;

displaying the plurality of retrieved objects rank-ordered by relevance to the search query; and returning the respective retrieved object to the requestor, the respective retrieved object including:

a plurality of facts, of the multiplicity of facts, the displayed facts rank-ordered by relevance to the search query;

a link to at least one object detail page for the respective retrieved object, the object detail page containing a plurality of additional facts included with the respective retrieved object of the fact repository; and a search link associated with a search query to execute by a service engine when selected by a user, wherein the search query includes at least one search query term derived from the plurality of facts associated with the at least one retrieved object.

* * * * *

UNITED STATES PATENT AND TRADEMARK OFFICE
CERTIFICATE OF CORRECTION

| | |
|---|---|
| PATENT NO. | : 7,774,328 B2 |
| APPLICATION NO. | : 11/356851 |
| DATED | : August 10, 2010 |
| INVENTOR(S) | : Andrew W. Hogue et al. |

It is certified that error appears in the above-identified patent and that said Letters Patent is hereby corrected as shown below:

Column 16, line 33, please delete "the a ," and insert -- the, --.

Signed and Sealed this

Twenty-sixth Day of October, 2010

David J. Kappos
*Director of the United States Patent and Trademark Office*